(12) United States Patent
Vohlgemuth

(10) Patent No.: US 9,995,308 B2
(45) Date of Patent: Jun. 12, 2018

(54) ELECTRIC MACHINE POWERED BY EXCITING ARMATURE

(75) Inventor: Patrick Vohlgemuth, La Rochefoucauld (FR)

(73) Assignee: MOTEURS LEROY-SOMER, Angouleme (FR)

( * ) Notice: Subject to any disclaimer, the term of this patent is extended or adjusted under 35 U.S.C. 154(b) by 742 days.

(21) Appl. No.: 14/342,112

(22) PCT Filed: Aug. 28, 2012

(86) PCT No.: PCT/IB2012/054413
§ 371 (c)(1),
(2), (4) Date: Mar. 17, 2014

(87) PCT Pub. No.: WO2013/030767
PCT Pub. Date: Mar. 7, 2013

(65) Prior Publication Data
US 2014/0205464 A1 Jul. 24, 2014

(30) Foreign Application Priority Data

Aug. 30, 2011 (FR) ...................................... 11 57634

(51) Int. Cl.
| | |
|---|---|
| *H02K 11/00* | (2016.01) |
| *H02K 9/00* | (2006.01) |
| *F04D 29/58* | (2006.01) |
| *F04D 27/00* | (2006.01) |
| *H02K 9/04* | (2006.01) |
| *F04D 25/06* | (2006.01) |
| *H02K 19/38* | (2006.01) |

(52) U.S. Cl.
CPC .......... *F04D 27/004* (2013.01); *F04D 25/06* (2013.01); *H02K 9/04* (2013.01); *H02K 19/38* (2013.01)

(58) Field of Classification Search
CPC ................................... H02K 9/00; H02K 9/08
USPC ..... 310/60 R, 68 C, 68 R; 417/366; 318/471
See application file for complete search history.

(56) References Cited

U.S. PATENT DOCUMENTS

| 3,142,772 A | * | 7/1964 | Jones ....................... H02K 9/06 310/59 |
| 3,535,567 A | * | 10/1970 | Boyson ................ H02K 11/042 310/68 R |
| 3,670,190 A | | 6/1972 | Goebel |
| 4,357,565 A | * | 11/1982 | Saito .................... H02H 7/0852 318/471 |

(Continued)

FOREIGN PATENT DOCUMENTS

| CN | 1184568 A | | 6/1998 | |
| DE | 1134453 B | * | 8/1962 | ............... H02K 9/04 |

(Continued)

OTHER PUBLICATIONS

Machine Translation DE1134453 (1962).*

(Continued)

*Primary Examiner* — Jose Gonzalez Quinone
(74) *Attorney, Agent, or Firm* — Oliff PLC

(57) ABSTRACT

The invention relates to an electric rotary machine including: a shaft of a rotor rotating about an axis, a fan carried by the shaft of the rotor, and a motor for driving the fan, allowing modulation of the relative rotational speed of the fan in relation to the shaft of the rotor.

8 Claims, 2 Drawing Sheets

(56) References Cited

U.S. PATENT DOCUMENTS

| | | | | |
|---|---|---|---|---|
| 4,446,391 A | * | 5/1984 | Sekine | ............... F04D 25/026 310/105 |
| 4,482,830 A | * | 11/1984 | Iwaki | .................. H02K 9/04 310/113 |
| 6,661,144 B1 | | 12/2003 | Diener et al. | |

FOREIGN PATENT DOCUMENTS

| | | | |
|---|---|---|---|
| DE | 10 2009 000 591 A1 | 8/2010 | |
| EP | 1 024 295 A1 | 8/2000 | |
| WO | WO 9637035 A1 * | 11/1996 | ........ F04D 25/026 |

OTHER PUBLICATIONS

Nov. 3, 2015 Office Action issued in Chinese Patent Application No. 201210001865.0.

Dec. 11, 2013 Search Report issued in International Patent Application No. PCT/IB2012/054413 (with translation).

Dec. 11, 2013 Written Opinion issued in International Patent Application No. PCT/IB2012/054413 (with translation).

* cited by examiner

ELECTRIC MACHINE POWERED BY EXCITING ARMATURE

The present invention relates to electrical rotating machines and more particularly those that are cooled by means of a fan incorporated into the machine.

Figure 1:
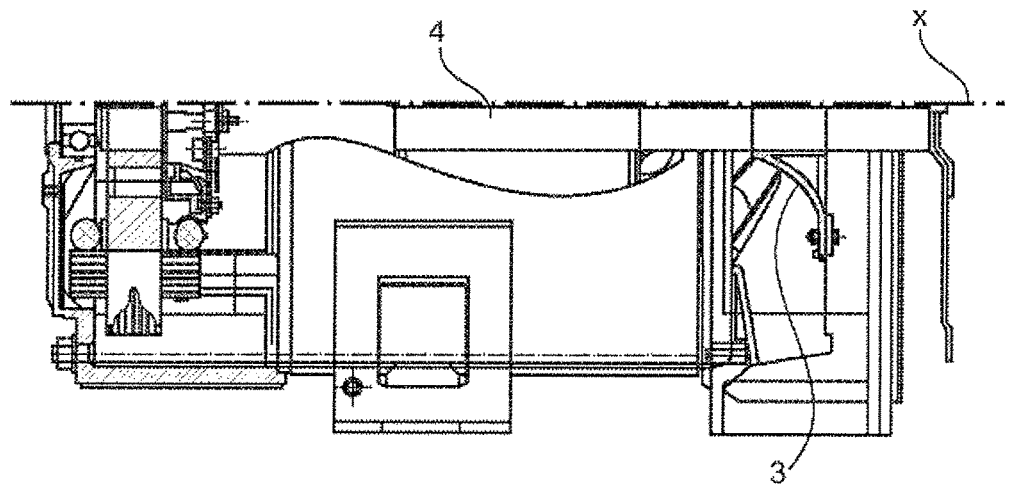

Conventionally, on certain electrical rotating machines, the fans are secured to the rotating portion of the machine, called the rotor, and consequently have a rotation speed that is identical to that of the shaft. FIG. 1 shows a machine of this type, in longitudinal half-section. The fan 3 is directly attached to the shaft 4 which rotates about an axis of rotation.

Another solution that is less widespread consists in connecting a forced ventilation upstream or downstream of a cooling circuit of the machine.

In the conventional case of a fan secured to the rotor, as illustrated in FIG. 1, the rotation speed of the rotor is fixed and corresponds to the nominal rotation speed when the machine is an alternator of which the rotor is driven at constant speed. The fan is sized to carry away the losses of the machine in the event of maximum load. Accordingly, the flow rate and the mechanical losses of the fan are constant and independent of the real cooling requirement of the machine.

In the case of an external forced ventilation, the flow rate of the ventilation can be adjusted to the real requirement of the calories to be cleared away from the machine. On the other hand, the fact that the ventilation source is outside the machine makes it difficult to orient and guide the air flow through the machine. It becomes virtually essential to install internal baffles in order to concentrate the air flow on the hot points. This solution leads to considerably increasing the external space requirement and the cost of the machine.

The object of the machine is to further enhance the electrical rotating machines notably in order to cool them better.

The subject of the invention is therefore an electrical rotating machine comprising:
  a rotor shaft rotating about an axis, and
  a fan supported by the shaft of the rotor,
the machine comprising a motor for driving the fan, making it possible to modulate the relative rotation speed of the fan with respect to the shaft, the fan preferably being connected to the rotor shaft via a motorized connection obtained with the aid of this motor.

By virtue of the invention, the fan is at the heart of the machine in order to provide optimal cooling, but its rotation speed is not necessarily equal to the shaft speed, being able to be faster or slower, depending on the direction and the speed of rotation of its motor. In this manner, it becomes possible to adjust the flow rate of the fan to the real cooling requirement of the machine.

By virtue of this system, by increasing the rotation speed of the fan, it is possible to extract more calories and therefore increase the specific power of the machine. The rotation speed of the fan can be slaved to the power demanded of the machine.

The direction and the speed of rotation of the fan may be slaved to the output power of the machine in order to optimize the overall efficiency of the installation. It is preferable to rotate in the same direction. The rotation speed of the fan may be controlled according to the temperature of at least one winding of the machine in order to ensure optimal cooling in the chosen class of temperature rise.

The motorized connection comprises the motor for driving the fan, the latter being able to be electrically powered by a winding of the rotor. The machine may be an alternator and the motor for driving the fan may be powered by an exciting armature supported by the rotor.

The rotor may comprise an electronic circuit for controlling the speed of the motor for driving the fan. The rotor may comprise a temperature sensor for sensing the temperature of a winding of the rotor and the electronic circuit may receive a signal from this sensor, the fan speed being modulated as a function of the measured temperature.

The fan may comprise blades secured to a tubular skirt supporting permanent magnets.

The fan may be placed inside a casing of the machine, the axial distance between a main portion of the rotor and the fan being less than the axial space requirement of the fan.

The machine may comprise a safety mechanism which causes the fan to rotate with the rotor shaft independently of the motorization of the connection between the fan and the rotor shaft, when a predefined condition is satisfied, notably a failure of the motorized connection or of the control electronics.

A further subject of the invention is a method for cooling an electrical rotating machine according to the invention, the fan being rotated at a variable speed relative to the motor shaft depending on the cooling requirement of the machine.

Figure 2:
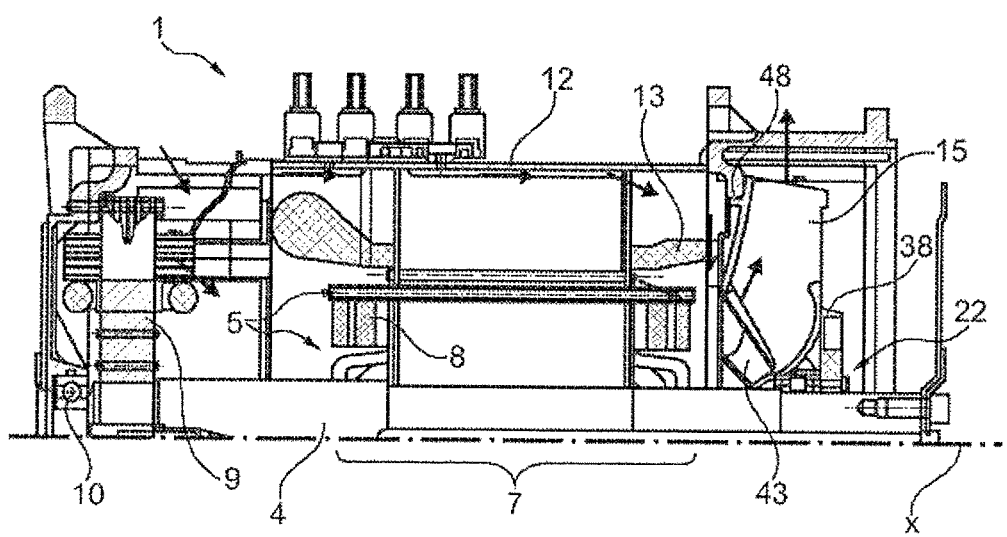
Figure 3:
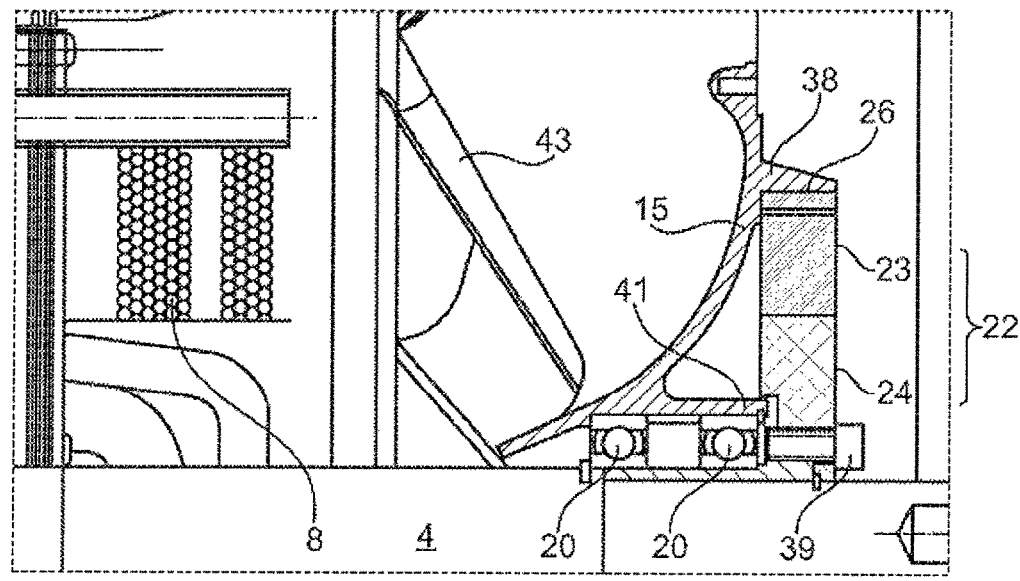
Figure 4:
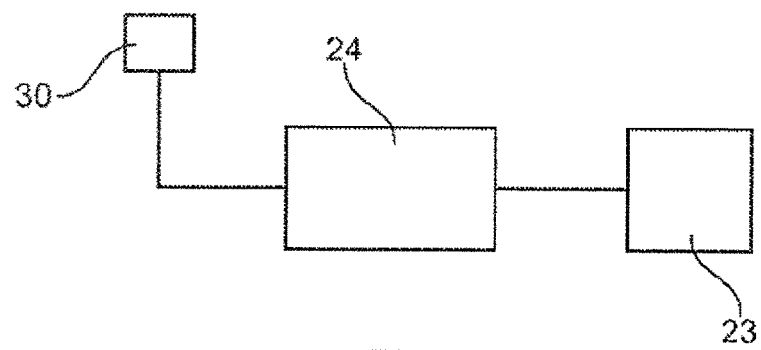

The invention can be better understood on reading the following detailed description of a non-limiting exemplary embodiment of the latter, and on examining the appended drawing in which:

FIG. 1, previously described, represents an electrical rotating machine produced according to the prior art, FIG. 2 is a view similar to FIG. 1 of a machine produced according to the invention, FIG. 3 represents a detail of FIG. 2, and FIG. 4 is a block diagram of an example of an electronic circuit for controlling the motor for driving the fan.

The electrical rotating machine 1 shown in FIGS. 2 and 3 is an alternator but the invention is not limited to a particular type of machine and also applies to motors. The following description is valid for all types of machines.

In the example of FIG. 2, the rotor 5 of the machine 1 comprises a main portion 7 comprising the magnet wheel 8, and also comprises, on one side of the main portion 7 an exciting armature 9.

The shaft 4 is supported by rolling bearings 10 which are present for example at the ends of the machine 1. The latter comprises a casing 12 which houses the stator 13 which may be conventional.

The rolling bearings provided for supporting the shaft 4 and guiding it in rotation about its longitudinal axis may be inside or outside the casing 12.

A fan 15 is supported by the shaft 4, on the side of the main portion 7, which is at the opposite end of the exciting armature 9.

The fan 15 is assembled to the shaft 4 of the rotor of the machine by means of rolling bearings 20. It is rotated by an electric motor 22, preferably of the DC brushless type, for example with a rotating cage 26 with permanent magnets.

The fan 15 may be made, for example by molding, with a tubular skirt 38 concentric with the axis X, on the radially inner face of which the magnets 26 are attached.

A stator magnetic circuit 23 is secured to the shaft 4 and its windings are powered by an electronic circuit 24 the components of which are for example present on a printed circuit board attached to the shaft 4, for example by screws 39, radially beyond the windings 23.

The electrical power supply of the motor 22 is advantageously drawn from the output of the exciting armature 9 of the alternator. Specifically, for reasons of capability to withstand transient overloads, the exciting armature designed to power the rotor of the alternator with DC current is usually capable of delivering a power that is much higher than is permanently needed by the rotor.

The operation of the motor 22 for driving the fan 15 may be autonomous, that is to say that the fan 15 rotates in a direction and at a speed that are determined by the electrical circuit 24 depending on parameters internal to the machine 1, and not signals originating from outside the machine.

As a variant, the rotor receives control signals, for example from a voltage regulator, which control the operation of the motor 22, these signals being for example transmitted by a wireless link between the rotor and the stator.

In the event of autonomous operation notably, the motor 22 may be slaved to the cooling requirement of the machine, determined for example by a temperature measurement.

In the example illustrated, the fan 15 is situated immediately next to the magnet wheel 8 of the alternator. It is therefore easy to place a temperature sensor 30 on the windings of the magnet wheel 8 and to ensure that this information is registered by the electronic circuit 24 for controlling the fan in order to optimize its rotation speed.

The air flow generated by the rotation of the fan 15 flows in the air gap. The fan 15 may comprise an annular lip 48 which rotates at a short distance from the housing in order to ensure that the air preferably flows through the passageways formed between the blades. The air flows have been indicated by arrows in FIG. 2.

The fact that the fan is immediately next to the main portion 7 of the rotor of the machine allows a large number of possibilities for securing ventilation in the event of failure of the electronic circuit for controlling the fan. A simple electromechanical device, for example a power failure device, may advantageously be provided in order to automatically resynchronize the fan with the shaft in the event of a malfunction of the fan motor 22.

In the event of the fan being motorized by a motor of the DC brushless type, it is possible to size the magnetic circuit so that the magnetic coupling between the magnets and the stator is sufficient to drive the fan in the event of a power failure.

If necessary, two such fans are provided, one at the front, the other at the rear, the air entering through the middle of the machine and the fans ejecting the air at the ends. The stator for driving the fan could also be on the stator of the machine.

The invention is not limited to the example that has just been described.

The expression "comprising one" must be understood as meaning "comprising at least one".

The invention claimed is:

1. An alternator comprising:
   a rotor comprising:
      a shaft rotating about an axis of rotation,
      a main portion comprising a magnetic wheel,
      an exciting armature supported by the shaft and configured to power the main portion with DC current,
   a fan supported by the shaft of the rotor, the fan being assembled to the shaft of the rotor by means of rolling bearings, and
   a motor for driving the fan, the motor being powered by the exciting armature and making it possible to modulate the relative rotation speed of the fan with respect to the shaft of the rotor.

2. The alternator as claimed in claim 1, the rotor comprising an electronic circuit for controlling the speed of the motor for driving the fan.

3. The alternator as claimed in claim 2, the rotor comprising a temperature sensor for sensing the temperature of a winding of the rotor and the electronic circuit receiving a signal from this sensor, the fan speed being modulated as a function of the measured temperature.

4. The alternator as claimed in claim 1, the fan comprising blades secured to a tubular skirt supporting permanent magnets.

5. The alternator as claimed in claim 1, the fan being placed inside a casing of the machine, the axial distance between a main portion of the rotor and the fan being less than the axial space requirement of the fan.

6. The alternator as claimed in claim 1, the fan rotation speed being slaved to the power demanded of the machine.

7. The alternator as claimed in claim 1, comprising a safety mechanism which causes the fan to rotate with the rotor shaft independently of the motorization of the connection between the fan and the rotor shaft when a failure of the motorized connection occurs.

8. A method for cooling an alternator as defined in claim 1, the fan being rotated at a variable speed relative to the shaft of the rotor depending on the cooling requirement of the machine.

* * * * *